United States Patent
Ring

[19]

[11] Patent Number: 6,116,385
[45] Date of Patent: Sep. 12, 2000

[54] DUAL FORCE RANGE TMX CYLINDER USING AN AIR BAG ACTUATOR

[75] Inventor: Michael E. Ring, Crown Point, Ind.

[73] Assignee: Westinghouse Air Brake Company, Wilmerding, Pa.

[21] Appl. No.: 09/245,943

[22] Filed: Feb. 5, 1999

[51] Int. Cl.$^7$ ............................. B60T 11/10; B60T 13/04; F01B 19/00
[52] U.S. Cl. .............................. 188/153 D; 92/99; 92/35; 92/39; 188/166
[58] Field of Search .......................... 188/153 D, 153 R, 188/365, 366, 367, 368, 166; 92/34, 35, 37, 39, 98 R, 99

[56] References Cited

U.S. PATENT DOCUMENTS

| | | | |
|---|---|---|---|
| 1,915,832 | 6/1933 | Mantle | 92/35 |
| 2,464,095 | 3/1949 | Nies | 92/35 |
| 2,485,815 | 10/1949 | Cook | 188/153 D |
| 3,589,481 | 6/1971 | Motsch et al. | 188/365 |
| 4,467,605 | 8/1984 | Smith | 188/153 D |

FOREIGN PATENT DOCUMENTS

| | | | |
|---|---|---|---|
| 928181 | 6/1963 | United Kingdom | 188/153 D |

*Primary Examiner*—Matthew C. Graham
*Assistant Examiner*—Lan Nguyen
*Attorney, Agent, or Firm*—James Ray & Associates

[57] ABSTRACT

An air bag actuated brake cylinder assembly for a railway vehicle braking system is provided which comprises a cylindrical casing engaged with the railway vehicle braking system including a hollow piston assembly having a piston rod assembly attached thereto and mounted for longitudinal movement within the cylindrical casing. An air bag actuator is engageable with the hollow piston assembly and an inner surface of the cylindrical casing for moving the piston and piston rod in an outward direction upon actuation thereof to initiate a braking sequence of the railway vehicle braking system. The air bag actuated brake cylinder assembly of the present invention allows for improved control of the movement of the brake cylinder piston and consequently improved control of the brake shoe forces which is especially desirable during light load conditions. Also, the air bag actuated brake cylinder of the invention is capable of accommodating piston bail and/or misalignment without leaking air. Additionally the air bag actuated brake cylinder assembly of the invention requires less maintenance to maintain the air tightness of the system and allows for the simple replacement of an inflatable bag into the cylinder should an air leak in the actuator occur. Currently used brake cylinder assemblies may be retrofitted with the air bag actuator of the invention.

19 Claims, 4 Drawing Sheets

DUAL FORCE RANGE TMX CYLINDER USING AN AIR BAG ACTUATOR

FIELD OF THE INVENTION

The present invention relates, in general, to a brake cylinder for use in railway vehicle brake assemblies and, more particularly to a brake cylinder using an air bag actuator for initiating a braking sequence in railway vehicle brake assemblies, especially truck-mounted brake assemblies.

BACKGROUND OF THE INVENTION

As is generally well known in the railway industry, truck mounted braking systems comprise a series of force transmitting members, levers and linkages which function to move a group of brake shoes against the wheels of a railway vehicle to effect stoppage of such railway vehicle. A pneumatically activated brake cylinder is typically provided in the braking system to initiate movement of this series of force transmitting members, levers and linkages to apply the brakes of the railway vehicle. A well known type of truck mounted braking systems is a TMX® truck mounted braking system (TMX® is a registered trademark to Westinghouse Airbrake Company, the assignee of the present invention).

A currently used pneumatically activated brake cylinder for TMX® truck mounted braking systems is shown in FIG. 2 and comprises an air cylinder piston which moves in a forwardly direction within a cylindrical member upon the application of pneumatic pressure thereto. A seal and/or diaphragm is provided on or adjacent with a first end of the piston. This seal and/or diaphragm contacts the inner surface of the cylindrical member so as to provide an airtight chamber at one end of the cylindrical member such that application of pneumatic pressure therein and against the first end of the piston enables forward movement of the piston. A piston rod is attached at a second end of the piston and moves in accordance with movement of the piston. An opposite end of the piston rod is connected to the end of a push rod which is, in turn, connected to a cylinder force transfer lever. This cylinder force transfer lever is connected through a series of force transmitting members and linkages so as to activate a braking sequence and apply the brake shoes to the vehicle wheels.

A disadvantage of this type of pneumatically activated brake cylinder is that due to regulations regarding the amount of air pressure which must be supplied into the brake cylinder, it is sometimes difficult to control the movement and/or force applied by the piston. During light load conditions, too much force applied by the piston can cause the brake shoe forces to be greater than necessary resulting in wheel skid. Another disadvantage is that care must be taken in the maintenance of the seals and/or diaphragms within the cylindrical member to ensure that leaking of air does not occur, resulting in a loss of pressure and a reduced amount of force being applied by the piston/piston rod assembly. Also, when cracking and/or deterioration of the seals and/or diaphragms does occur, the air brake cylinder must be completely disassembled in order to repair or replace the defective components. Another disadvantage of the currently used air brake cylinders is their inability to accommodate piston bail or misalignment without leaking air.

SUMMARY OF THE INVENTION

It is an object of the present invention to provide an air bag actuated brake cylinder assembly for a railway vehicle braking system which allows for improved control of the movement of the brake cylinder piston and consequently improved control of the brake shoe forces.

It is a further object of the invention to provide an air bag actuated brake cylinder which allows for a reduced amount of pressure to be applied to the brake cylinder piston during light car conditions.

It is yet a further object of the invention to provide an air bag actuated brake cylinder assembly which is capable of accommodating piston bail and/or misalignment without leaking air.

It is another object of the invention to provide an air bag actuated brake cylinder assembly which requires less maintenance to maintain the air tightness of the system and allows for the simple replacement of an inflatable bag into the cylinder should an air leak in the actuator occur.

It is yet another object of the invention to provide an economically desirable alternative to the seal/diaphragm system currently in use.

Briefly, and in accordance with the foregoing objects, the brake cylinder of the invention comprises a cylindrical casing engaged with a railway vehicle braking system, a hollow piston assembly having a first surface and an opposed second surface and being mounted for reciprocal movement within the cylindrical casing, at least one air bag actuator engagable with the first surface of the hollow piston assembly and an opposed inner surface of such cylindrical casing, air communication means in fluid communication with an interior portion of the at least one air bag actuator for allowing the application and removal of air from the air bag actuator during a brake application or a brake release, and a piston rod assembly associated with the opposed second end of the hollow piston assembly. This piston rod assembly is capable of movement in an outward direction from the cylindrical casing upon actuation of the air bag actuator to initiate a braking sequence for the railway vehicle braking system. The communication means comprises an air inlet means which is provided in the cylindrical casing and the air bag actuator to enable application of pneumatic pressure within the air bag to form a first air cavity. A packing cup is provided on the hollow piston assembly producing a seal between the hollow piston assembly and the inner surface of the cylindrical member to form a second air cavity. An air inlet flange is also provided on the cylindrical member to enable the application into and the evacuation of air from the second cavity.

Although a number of objects and advantages of the present invention have been described in some detail above, various additional objects and advantages of the brake cylinder of the present invention will become more readily apparent to those persons who are skilled in the art from the following more detailed description of the invention, particularly when such detailed description of the invention is taken in conjunction with both the attached drawing figures and with the appended claims.

DETAILED DESCRIPTION OF THE INVENTION

Figure 1:
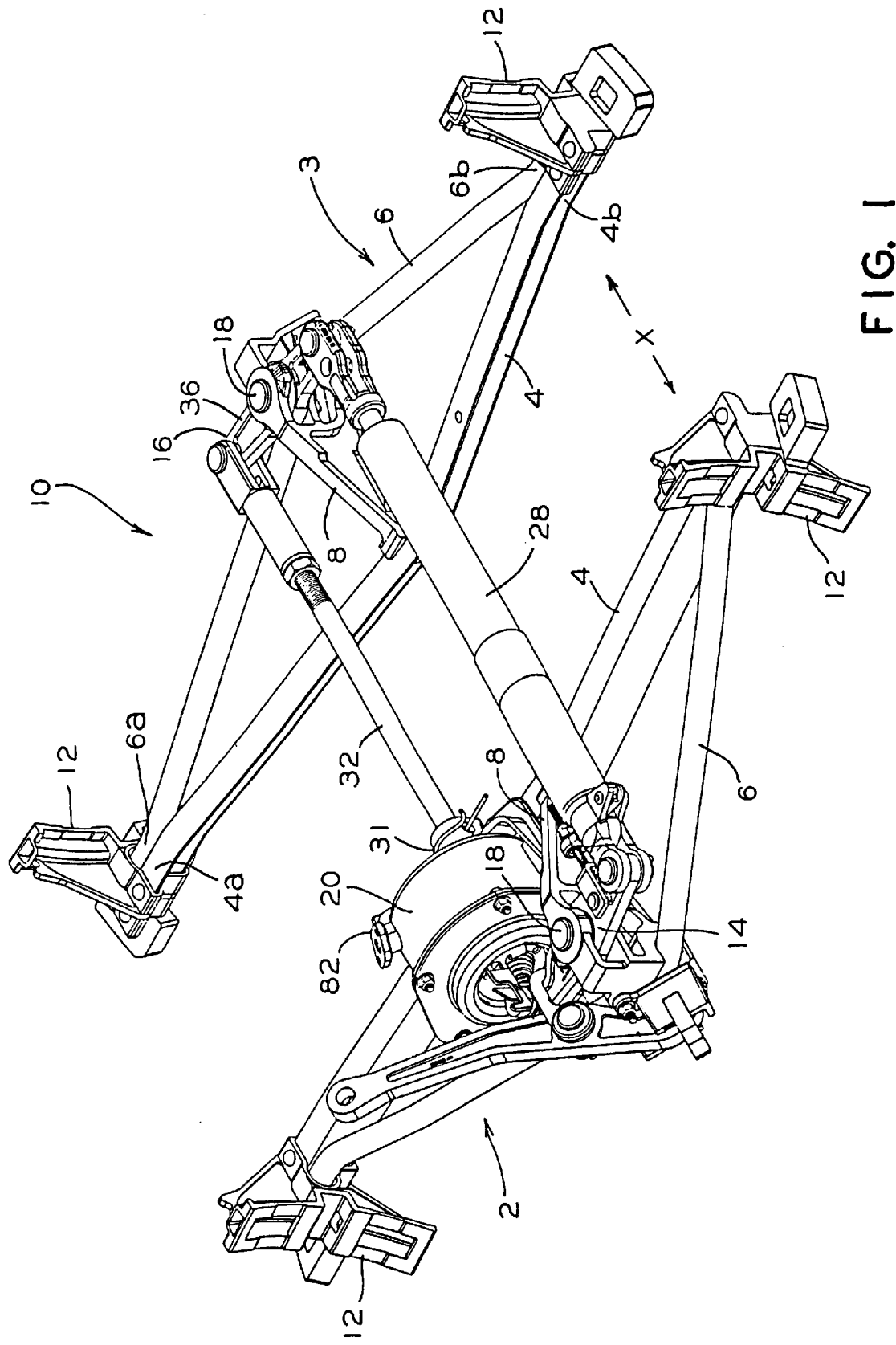
FIG. 1 is a plan view of a railway vehicle truck-mounted brake assembly including the brake cylinder of the present invention.

Prior to proceeding with the more detailed description of the invention, a description of a truck mounted braking system and its functioning should provide helpful in understanding the present invention. Also, it should be noted that for the sake of clarity, identical components which have identical functions have been identified with identical reference numerals throughout the several views illustrated in the attached drawing figures.

Referring now to FIG. 1, there is shown a presently preferred embodiment of a truck-mounted brake assembly, generally designated 10, for a railway car (not shown). This brake assembly 10 comprises brake beams, generally designated 2 and 3, which are substantially identical. Each of the brake beams 2 and 3 includes a compression member 4, a tension member 6 and a strut member 8. The opposite ends of the compression member 4 and the tension member 6 may be permanently connected together, preferably by welding along an outer segment 4a–6a, 4b–6b at the opposite ends of the compression member 4 and the tension member 6.

At a location substantially midway between their opposite ends, the compression member 4 and the tension member 6 of the, respective, brake beams 2 and 3 are spaced apart sufficiently to allow connection of the strut member 8 therebetween. Mounted on the respective outer end segments 4a–6a, 4b–6b of the brake beams 2 and 3 are brake heads 12.

A pair of force-transfer levers 14 and 16 are pivotally connected by pins 18 to the strut member 8 of the respective brake beams 2 and 3. Each end of the respective force-transfer levers 14 and 16 is interconnected via a force-transmitting member 28, which may be in the form of a slack adjuster device. The opposite end 36 of the force-transfer lever 16 is connected to the brake cylinder assembly 20 at connecting means 31 via a force-transmitting member or a return push rod assembly 32.

Figure 2:
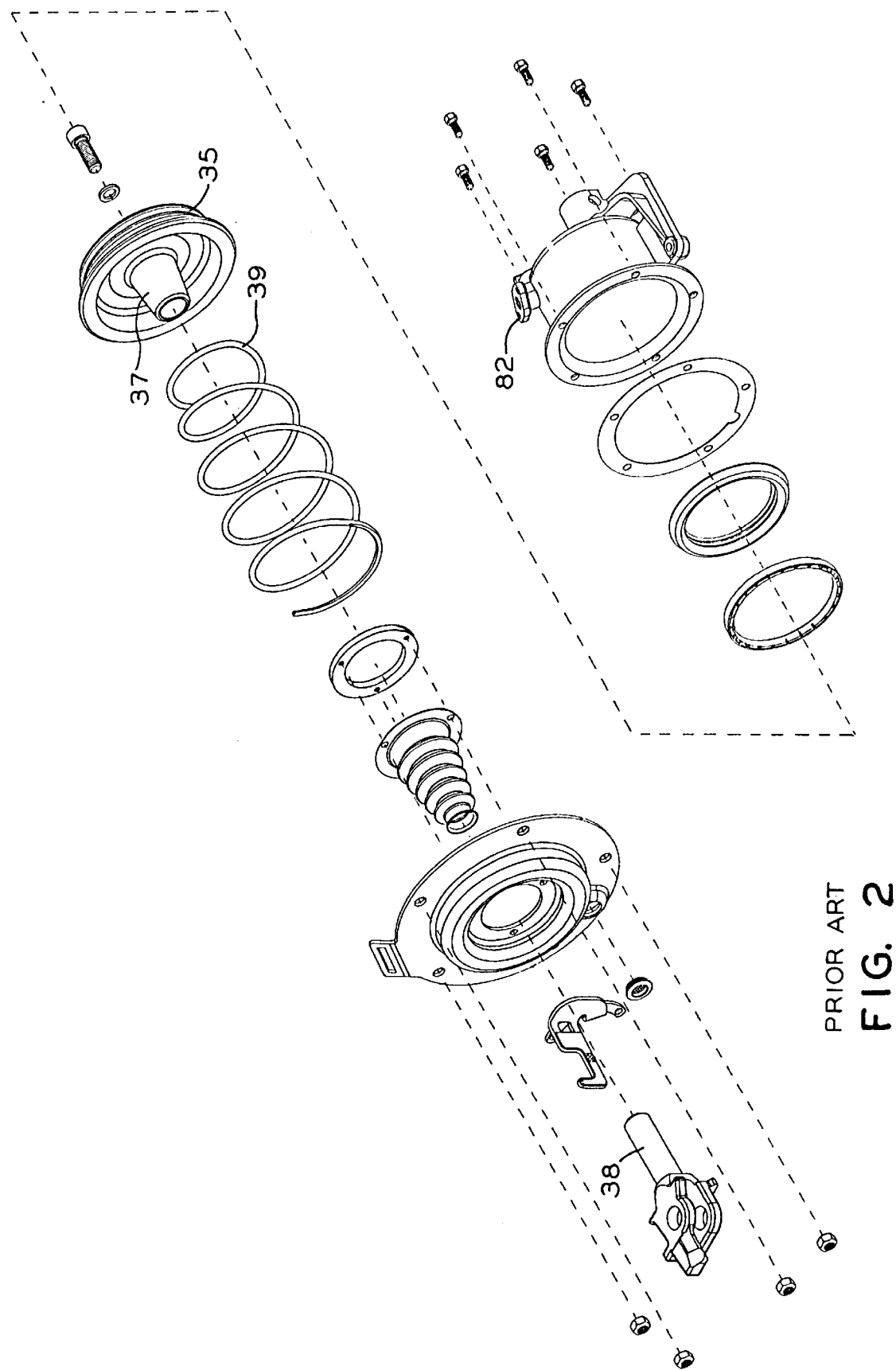
FIG. 2 is an expanded view of the prior art type brake cylinder which is currently in use in TMX® truck mounted braking systems.

Referring to FIG. 2, when a brake application is made, pressurization of the brake cylinder assembly 20 will result in actuation of an air brake cylinder piston 35, located in the brake cylinder assembly 20. This actuation of the piston 35 causes movement of a piston rod 37 in a forward direction which causes a return spring 39, located in some types of the brake cylinder assemblies 20, to compress. The piston rod 37 is associated with a force transfer lever 14 via a push rod 38 such that actuation of the brake cylinder, in this manner, will result in movement of a push rod 38 in a direction to effect a counterclockwise rotation of the force-transfer lever 14. The force transfer lever 14, in turn, actuates the slack adjuster assembly 28 to effect counterclockwise rotation of the force-transfer lever 16 and consequent actuation of the return push rod assembly 32.

The force-transfer levers 14 and 16, along with the slack adjuster assembly 28, the return push rod assembly 32 and the brake cylinder assembly 20 comprise a brake beam actuating linkage that interconnects the, respective, brake beams 2 and 3 via the pivot pins 18 and thus the required brake actuation forces effectively act along these pivot pins 18. The resultant of these forces is shown at X. Because the slack adjuster assembly 28 acts as a rigid member during a brake application, it is important that the length of the slack adjuster assembly 28 be allowed to increase with brake shoe wear and/or loss of a brake shoe during service so that movement of the brake cylinder piston 35 and piston rod 37 will enable such brake beams 2 and 3 to be moved apart by the brake beams linkage until brake shoe engagement with the tread surface of the vehicle wheels occurs.

As shown in FIG. 2, a currently used air brake cylinder comprises an air cylinder piston 35 which moves in a forwardly direction upon the application of pneumatic pressure at one side thereof. A piston rod 37 is attached to an opposite side of the piston 35 and moves in accordance with the movement of the piston 35. A second end of the piston rod 37 is connected to the end of a push rod 38 which is, in turn, connected to the force transfer lever 14. This type of design requires the provision of an air tight seal between the edge of the piston 35 and the inner surface of the cylinder so that pneumatic pressure applied to one side of the piston 35 effects movement of the piston 35 and piston rod 37 in a forwardly direction.

A disadvantage with this type of system is that it is difficult to control the movement and/or amount of force applied by the piston which results in difficulty in controlling the brake shoe forces. Some countries require that a certain amount of pressure, such as at least 1–1.15 bar greater than atmosphere, be applied within the brake cylinder. Due to the size of the brake cylinder, this amount of pressure applied therein can cause a high amount of force being applied by the piston and consequently the brake shoes. During light load conditions of the railway vehicle, this high amount of force applied by the brake shoes to the wheels is not necessary in order to stop the railway vehicle. The air bag actuator of the present invention provides a means for stopping the railway vehicle under light load conditions while avoiding skidding of the vehicle wheels. During full load conditions, a second air inlet means is provided on the cylindrical member so that sufficient pressure may be applied to the piston to stop the railway vehicle.

Other disadvantages of the prior art brake cylinders are that they require a high level of maintenance to ensure the air tightness of the seals and/or diaphragms. Significant time and effort are required in replacing defective seals and/or diaphragms. Also, these systems are unable to accommodate piston bail and/or misalignment without leaking air.

Figure 3:
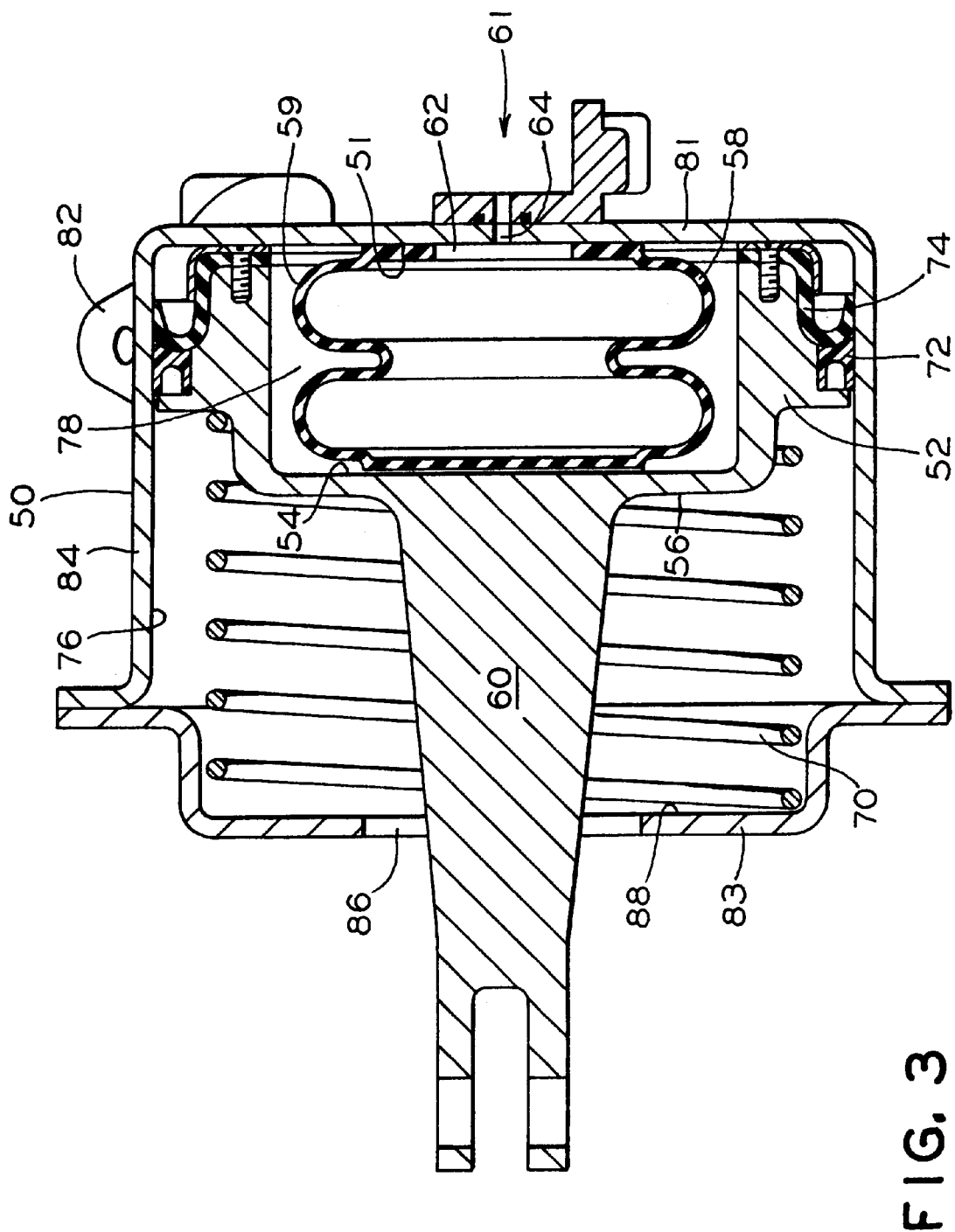
FIG. 3 is a cross-sectional view of one type of a brake cylinder including the air bag actuator of the invention with the piston in the released position.
Figure 4:
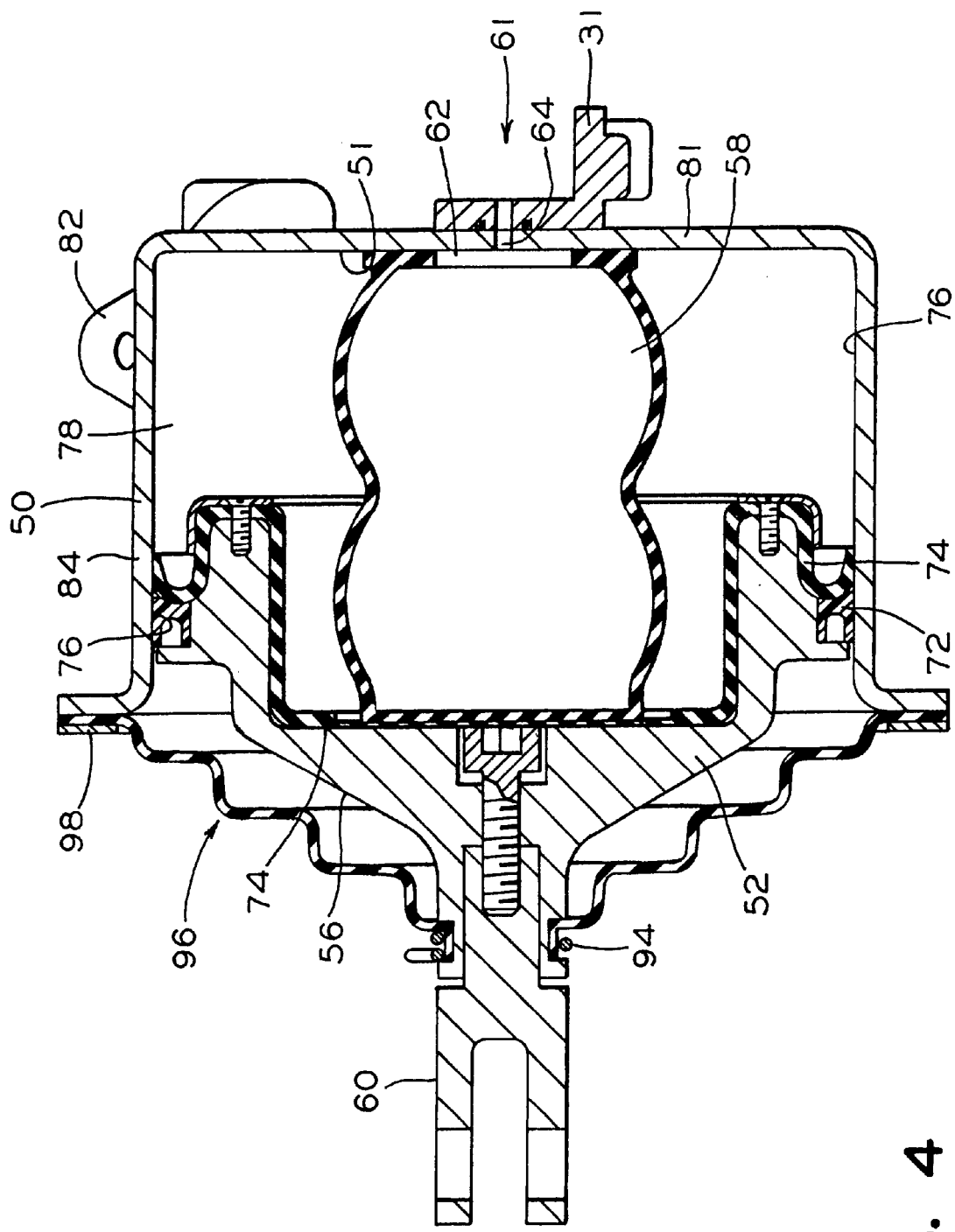
FIG. 4 is a cross-sectional view of another type of brake cylinder including the air bag actuator of the invention with the piston in the extended position.

Referring to FIGS. 3–4, a cross-sectional view of two different types of brake cylinders including the air bag actuator of the present invention in a retracted and extended position is shown. The brake cylinder comprises a cylindrical casing 50. This cylindrical casing is engagable with the railway vehicle braking system as illustrated in FIG. 1. Any well known technique may be used to position and/or mount the brake cylinder assembly 20 to the braking system. For example, the brake cylinder assembly 20 can be connected to both the strut member 8, adjacent one side thereof, and the compression member 4 in the space located between the compression member 4 and the tension member 6. In this arrangement, the weight of the brake cylinder assembly and the force-transmitting members is carried by the brake beams 2 and 3, which are, in turn, supported by the truck side frames (not shown). A connecting means 31 is provided for connecting a back portion of the cylindrical casing with the return push rod 32.

A hollow piston assembly 52 is mounted for reciprocal movement within the cylindrical casing 50. This hollow piston assembly 52 has a first surface 54 and an opposed second surface 56. At least one air bag actuator 58 is engagable with this first surface 54 of the hollow piston assembly 52 as well as an inner surface 51 of the cylindrical member 50. A piston rod assembly 60 is connected to the opposed second surface 56 of the hollow piston assembly 52. This piston rod assembly 60 is capable of movement in an outward direction upon actuation of the air bag actuator 58 to initiate a braking sequence of the railway vehicle braking system.

The air bag actuator includes air communication means, generally designated as 61, in fluid communication with an interior portion of the at least one air bag actuator 58 for supplying air pressure to the at least one air bag actuator 58 to cause actuation of this air bag actuator 58 during a brake application and also for removing or evacuating air from the air bag actuator 58 to cause deactivation of the air bag actuator 58 during a brake release. This air communication means 61 includes at least one air inlet port 62 which is typically substantially in alignment with a corresponding air inlet port 64 in the cylindrical casing 50. This air bag actuator forms a first air cavity which is capable of engaging the first surface 54 of the hollow piston assembly 52 upon the introduction of air into the air bag actuator through the air inlet ports 62, 64 of the air bag actuator 58 and the cylindrical casing 50. Any commercially available inflatable bag may be used as long as this bag is capable of withstanding the amount of air pressure applied thereto and capable of providing sufficient force to move the hollow piston assembly 52 and piston rod 60 to initiate a braking sequence.

The brake cylinder design of FIG. 3 comprises a cylindrical casing 50 having a first end 81, a second end 83 and a peripheral sidewall 84. The hollow piston assembly 52 is mounted for reciprocal movement within this cylindrical casing 50 and the at least one air bag actuator 58 is engageable with a first surface of such hollow piston assembly 52 and an inner surface 51 of the first end 81 of the cylindrical casing 50 upon actuation of the at least one air bag actuator 58. A piston rod assembly 60 is integrally formed with a second surface 56 of the hollow piston assembly 52 and extends through an opening 86 in the second end 83 of the cylindrical casing. This piston rod assembly 60 is capable of movement in an outward direction upon actuation of the at least one air bag actuator 58. Also included within the cylindrical casing is at least one spring member 70 which is caged between an inner surface 88 of the second end 83 of the cylindrical casing 50 and the second surface 56 of the hollow piston assembly 52 for returning the hollow piston assembly 52 and piston rod 60 to a retracted position upon deactivation of the at least one air bag actuator 58.

In the brake cylinder design of FIG. 4, upon deactivation or removal of air from the bag and/or cylinder, the hollow piston assembly 52 and piston rod assembly 60 are "walked" back to their initial positions by means of gravity and/or vibration. An internal or external spring could optionally be included in this design to assist in returning the piston/piston rod to their initial positions. In this design, the piston rod 60 is connected to the second surface 56 of the hollow piston assembly 52 such as with a spring clip 94. A protecting means, such as a dust boot 96, is positioned adjacent to at least a portion of this second surface 56 of the hollow piston assembly 52 and engageable and/or secured with a portion of the cylindrical casing 50 by means of a dust boot support ring 98 for enclosing and protecting this second surface 56 of the hollow piston assembly 52.

As shown in FIGS. 3 and 4, a sealing, means such as a packing cup 74, may be provided for sealing the edges of the hollow piston assembly 52 with the inner surface 76 of the cylindrical casing 50. As illustrated in FIG. 4, this sealing means 74 may be positioned adjacent the first surface 54 of the hollow piston assembly 52. A guide ring 72 may also be provided between the piston 52 and this inner surface 76. The sealing means 74 cooperates with an outer surface 59 of the air bag actuator 58 to form a second air cavity 78 within the cylindrical casing 50. A second air inlet means, such as an inlet flange 82, is provided so that air may be supplied into this second air cavity during times when the railway vehicle is fully loaded. A means is also provided for evacuating the air within the second air cavity during a release of the brakes in the braking system. This second cavity may be vented to atmosphere during light load conditions when only the air bag actuator is in use.

Currently used brake cylinder assemblies may be retrofitted with the air bag actuator of the present invention by replacing the piston cup, element 35 in FIG. 2, with a hollow piston assembly 52 as shown in FIGS. 3 and 4, inserting a commercially available air bag actuator 58 into the cylindrical casing 50, and providing an air inlet port 64 in the casing 50 which is substantially in alignment with the air inlet port 62 in the air bag actuator 58 so as to enable inflation of the actuator which consequently applies a force to the hollow piston assembly 52, as well as, the piston rod assembly 60.

Thus, the present invention has been described in such full, clear, concise and exact terms as to enable any person skilled in the art to which it pertains to make and use the same. It will be understood that variations, modifications, equivalents and substitutions for components of the specifically described embodiments of the invention may be made by those skilled in the art without departing from the spirit and scope of the invention as set forth in the appended claims.

I claim:

1. A brake cylinder for use in a railway vehicle braking system comprising:
    (a) a cylindrical casing engageable with such railway vehicle braking system;
    (b) a hollow piston assembly mounted for reciprocal movement within said cylindrical casing;
    (c) at least one air bag actuator disposed between and engageable with a first surface of said hollow piston assembly and an opposed inner surface of said cylindrical casing upon actuation of said at least one air bag actuator;
    (d) air communication means in fluid communication with an interior portion of said at least one air bag actuator for supplying air pressure to said at least one air bag actuator during a brake application of such railway vehicle braking system and for evacuating air pressure from said at least one air bag actuator during a brake release of such railway vehicle braking system; and
    (e) a piston rod assembly connected with a second surface of said hollow piston assembly, said piston rod assembly capable of movement in an outward direction during such brake application to initiate a braking sequence of such railway vehicle braking system.

2. A brake cylinder as recited in claim 1 wherein said air communication means includes an air inlet port in said at least one air bag actuator.

3. A brake cylinder as recited in claim 2 wherein said air communication means includes a first air inlet port in said cylindrical casing substantially in alignment with said air inlet port in said at least one air bag actuator.

4. A brake cylinder as recited in claim 1 wherein said at least one air bag actuator is capable of accommodating piston bail and/or misalignment without leaking air.

5. A brake cylinder as recited in claim 3 including a sealing means engageable with an inner surface of said cylindrical casing and said hollow piston assembly for sealing said hollow piston assembly with the inner surface of said cylindrical casing.

6. A brake cylinder as recited in claim 1 wherein said at least one air bag actuator forms a first air cavity within said cylindrical casing.

7. A brake cylinder as recited in claim 5 wherein said at least one air bag actuator forms a first air cavity within said cylindrical casing.

8. A brake cylinder as recited in claim 7 wherein said sealing means cooperates with an outer surface of said at least one air bag actuator to form a second air cavity within said cylindrical casing.

9. A brake cylinder as recited in claim 8 including a second air inlet port on said cylindrical casing for supplying air pressure within said second air cavity during a brake application of such railway vehicle braking system.

10. A brake cylinder as recited in claim 9 wherein said second air inlet port on said cylindrical casing includes means for evacuating air contained within said second air cavity during a brake release of such railway vehicle braking system.

11. A brake cylinder as recited in claim 1 wherein said cylindrical casing is capable of being mounted on a brake beam in a TMX® truck mounted braking system.

12. A brake cylinder for use in a railway vehicle braking system comprising:
   (a) a cylindrical casing engageable with such railway vehicle braking system having a first end, a second end and a peripheral sidewall;
   (b) a hollow piston assembly mounted for reciprocal movement within said cylindrical casing;
   (c) at least one air bag actuator disposed between and engageable with a first surface of said hollow piston assembly and an inner surface of said first end of said cylindrical casing upon actuation of said at least one air bag actuator;
   (d) air communication means in fluid communication with an interior portion of said at least one air bag actuator for supplying air pressure to said at least one air bag actuator during a brake application of such railway vehicle braking system and for evacuating air pressure from said at least one air bag actuator during a brake release of such railway vehicle braking system; and
   (e) a piston rod assembly integrally formed with a second surface of said hollow piston assembly and extending through an opening in said second end of said cylindrical casing, said piston rod assembly capable of movement in an outward direction during such brake application to initiate a braking sequence of such railway vehicle braking system.

13. A brake cylinder as recited in claim 12 wherein said brake cylinder includes at least one spring member caged between an inner surface of said second end of said cylindrical casing and said second surface of said hollow piston assembly for returning said hollow piston assembly and said piston rod assembly to a retracted position upon deactivation of said at least one air bag actuator.

14. A brake cylinder as recited in claim 12 including a sealing means engageable with an inner surface of said peripheral sidewall of said cylindrical casing and said hollow piston assembly for sealing said hollow piston assembly with the inner surface of said peripheral sidewall of said cylindrical casing.

15. A brake cylinder as recited in claim 14 wherein said sealing means includes a packing cup.

16. A brake cylinder for use in a railway vehicle braking system comprising:
   (a) a cylindrical casing engageable with such railway vehicle braking system;
   (b) a hollow piston assembly mounted for reciprocal movement within said cylindrical casing;
   (c) at least one air bag actuator disposed between and engageable with a first surface of said hollow piston assembly and an opposed inner surface of said cylindrical casing upon actuation of said at least one air bag actuator;
   (d) air communication means in fluid communication with an interior portion of said at least one air bag actuator for supplying air pressure to said at least one air bag actuator during a brake application of such railway vehicle braking system and for evacuating air pressure from said at least one air bag actuator during a brake release;
   (e) a piston rod assembly connected with a second surface of said hollow piston assembly, said piston rod assembly capable of movement in an outward direction during such brake application to initiate a braking sequence of such railway vehicle braking system; and
   (f) protecting means adjacent at least a portion of said second surface of said hollow piston assembly for protecting said second surface of said hollow piston assembly.

17. A brake cylinder as recited in claim 16 wherein said protecting means includes a dust boot engageable with a portion of said cylindrical casing for enclosing and protecting said second surface of said hollow piston assembly.

18. A brake cylinder as recited in claim 16 including a sealing means engageable with an inner surface of said cylindrical casing and said hollow piston assembly for sealing said hollow piston assembly with the inner surface of said cylindrical casing.

19. A brake cylinder as recited in claim 18 wherein said sealing means includes a packing cup disposed adjacent said first surface of said hollow piston assembly.

* * * * *